United States Patent [19]

Josefsson et al.

[11] 4,375,641
[45] Mar. 1, 1983

[54] METHOD IN A TRACKING RADAR TO ATTAIN A LARGE UNAMBIGUOUS RANGE FOR DETECTED TARGETS BY MEANS OF RADAR PULSES WITH HIGH REPETITION FREQUENCY

[75] Inventors: Lars G. Josefsson, Lindome; Karl-Erik I. Oderland; Jan-Olov Winnberg, both of Mölndal, all of Sweden

[73] Assignee: Telefonaktiebolaget L M Ericsson, Stockholm, Sweden

[21] Appl. No.: 227,081

[22] PCT Filed: Apr. 23, 1980

[86] PCT No.: PCT/SE80/00122

§ 371 Date: Dec. 25, 1980

§ 102(e) Date: Dec. 23, 1980

[87] PCT Pub. No.: WO80/02325

PCT Pub. Date: Oct. 30, 1980

[30] Foreign Application Priority Data

Apr. 25, 1979 [SE] Sweden .............................. 7903653

[51] Int. Cl.³ .............................................. G01S 13/24
[52] U.S. Cl. ............................................ 343/17.2 R
[58] Field of Search ................................. 343/17.2 R

[56] References Cited

U.S. PATENT DOCUMENTS 3,383,686  5/1968  Davis et al. ............... 343/17.2 R X
3,883,871  5/1975  Moore ............................ 343/17.2 R Primary Examiner—T. H. Tubbesing

[57] ABSTRACT

The invention relates to a method for a tracking radar which transmits radar pulses towards a certain target whose target range from the beginning is known. The carrier frequency of the transmitted radar pulses are during the target tracking varied from one pulse to the next following, so that a pulse series including a certain number M of carrier frequencies is treated. The number M is chosen with reference to the continuously measured target range and as long as this range is less than a certain value. If the target range exceeds this value the number M of carrier frequencies is changed and a new pulse series including this new number is transmitted. The unambiguous range to the followed target becomes dependent on the frequency repetition frequency in the transmitted pulse series instead of the PRF of the radar.

2 Claims, 6 Drawing Figures $f_{FRF} = 1/T$     $f_{PRF} = 1/t$     $f_{PRF} = M f_{FRF}$

TRANSMISSION

LISTENING

METHOD IN A TRACKING RADAR TO ATTAIN A LARGE UNAMBIGUOUS RANGE FOR DETECTED TARGETS BY MEANS OF RADAR PULSES WITH HIGH REPETITION FREQUENCY

FIELD OF THE INVENTION

The invention relates to a method used in a tracking radar for obtaining a large unambiguous range. More specifically the invention relates to a method in which the transmitted radar pulses have a high PRF (Pulse repetition frequency) and where the carrier frequency varies from one pulse to another without the range of the radar being limited to a certain unambigous range determined by the PRF.

DESCRIPTION OF PRIOR ART

The most important task of a tracking radar is, after the position of a certain moving target is established, to follow the target, for example, regarding its distance and give information about the continued movement of the target, see for example Barton "Radar System Analysis" Prentice Hall Electrical Engineering Series 1964 Chap. 9, page 263. In known tracking radar systems, radar pulses are transmitted with a certain determined carrier frequency and with such a value of the pulse repetition frequency (PRF) that a pulse reflected from the target returns within a time interval before the next pulse is transmitted, the so called listening interval. The condition that the reflected target echo pulse has to arrive within the listening interval is necessary, since otherwise the position of the target could not be detected unambigously.

It is furthermore previously known to vary the carrier frequency from pulse to pulse of the radar signals transmitted towards the target, see for example the U.S. Pat. Nos. 3,413,634 and 3,372,391. The purpose of this frequency change is to prevent disturbing eches from influencing the reception. In particular, the local oscillator of the radar receiver is tuned concurrently with the transmitted pulses and to the frequency of each of these, so that only desired echo signals are detected and the radar is uninfluenced by undesired disturbing echoes. Known tracking radar stations which use this principle are, however, still bound to the condition that the pulse repetition frequency (PRF) has to be such that the echo pulse returns within the listening interval.

SUMMARY OF THE INVENTION

As briefly mentioned above, the PRF of the radar, the repetition frequency of the transmitted pulses, is crucial for unambiguous determination of the target the radar has to follow, for example, concerning the range, the angle position or the speed. If the target is situated within a certain short range from the antenna, a relatively high value can be chosen for the PRF of the radar without the risk that an ambiguity arises, while if the target range is long, a sufficently low value of the PRF has to be chosen. More specifically it is valid that the so called unambiguity range $R_o = c/2f_{PRF}$, where $f_{PRF}$ is the pulse repetition frequency for the transmitted radar pulses and c is the speed of light. Thus the condition $f_{PRF} \leq c/2R_o$ has to be fulfilled for unambiguous detection of the target range.

In a tracking radar it is, however, desirable that the value of the $f_{PRF}$ be kept at such a high value as possible so that the target can be better followed. A high value means that the information about the target position more often is received than in the case when pulses with a low value of the $f_{PRF}$ are transmitted. On the other hand a high PRF-value implies, according to the above, a small unambiguous range which can mean that a reflected pulse cannot be detected and that ambiguity about the target range can arise. These two conflicting demands constitute the basic problem for the invention which is intended to be solved by means of the invention. One condition is that the target distance from the beginning is known with an accuracy equal to $\pm \frac{1}{2}$ (ct/2), where t is the length of the listening interval.

According to the invention, radar pulses are transmitted whose carrier frequency in a manner known per se varies from pulse to pulse and in accordance with a certain randomly chosen pattern. The number of the chosen frequencies M of a totality N forms a pulse series with a certain time length corresponding to a certain actual initially known target range. A certain ambiguity range is then obtained larger than the target range and defined as the time between two transmitted pulses with the same carrier frequency multiplied with the factor c/2. The pulse series are transmitted sequentially with a certain frequency, the so called frequency repetition frequency $f_{FRF}$. When the target has moved so far that the time between the pulses with the same carrier frequency is insufficient to get an unambiguous range determination, a new pulse series is chosen with a larger number of carrier frequencies $M \leq N$, the frequency repetition frequency being reduced and a larger unambiguous range ($c/2 f_{FRF}$) is obtained.

BRIEF DESCRIPTION OF THE DRAWINGS

The invention will be explained more fully with reference to the accompanying drawings, where.

PREFERRED EMBODIMENTS

Figure 1:
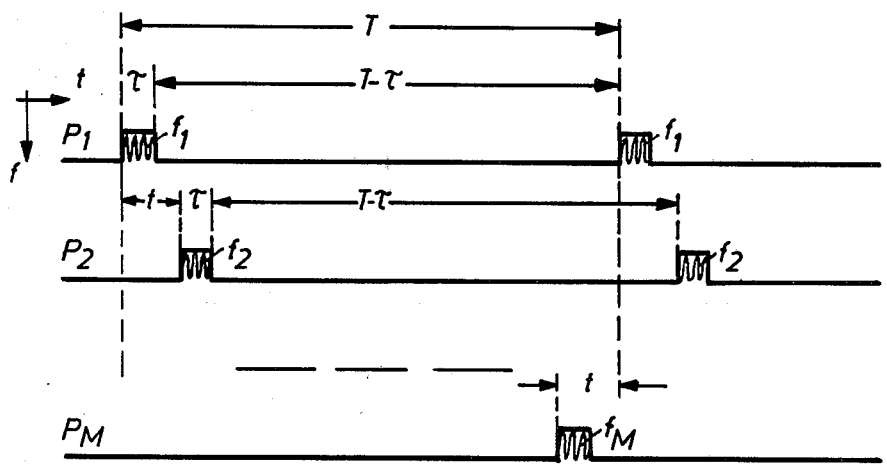
FIG. 1 shows a diagram of transmitted radar pulses at different instants and with different frequencies according to the invention.

FIG. 1 is a diagram which shows a number M of transmitted radar pulses, P1, P2, ... PM. Each pulse has a length $\tau$, a carrier frequency $f_1, f_2, \ldots f_M$ which mutually are different. The period time, i.e. the time between two pulses with the same carrier frequency is denoted T. The time between transmission of two pulses with different frequencies, for example $f_1$ and $f_2$ is denoted by t, the listening interval being $t-\tau \approx t$, since $\tau \ll t$. In FIG. 1 the pulse time $\tau$ has been exaggerated for better clarity. The listening interval constitutes the time interval when a reflected transmission pulse from the target with certain frequency can be received and correctly indicated for the measuring of, for example, the target range. Furthermore, it is valid that the pulse repetition frequency $f_{PRF} = 1/t$ and the so called frequency repetition frequency $f_{FRF} = 1/t$ which indicates the frequency with which pulses with the same carrier frequency return earliest.

It is previously known in pulse radar systems to vary the carrier frequency from a transmitted radar pulse to another. The PRF of the radar is, however, in such a system chosen so that sufficient listening interval t-$\tau$ is obtained in order that the echo from, for example, the pulse P1 (frequency $f_1$) will return in time from the target to the radar receiver before the next pulse P2 (frequency $f_2$) is transmitted. The pulse repetition frequency $f_{PRF}$, therefore, has to be adapted to the present target range.

According to the present invention radar pulses are transmitted as in known systems with mutually unequal frequency but with such a high pulse repetition frequency $f_{PRF}$ that only a certain part of the target distance the so called range aperture $\leq c/2\ f_{PRF}$ is indicated, which belongs to a known target postion, i.e. the method is only applicable in a tracking radar.

At first, a rough estimate of the target range is carried out, in the radar, for example, by any form of designation in known manner. Then a certain value=Ro is obtained. After that, a certain value is chosen for the frequency repetition frequency $f_{FRF}$ so that $c/2\ f_{FRF} > Ro$ ... (1), i.e.

$$\frac{1}{f_{FRF}} = T > \frac{2Ro}{c}$$

which indicates that the unambiguity range should be larger than the estimated value on the target range Ro. The choice of M different frequencies which are repeated periodically and in the same order defines a number of pulse series, where each series includes M different frequencies and are repeated with the frequency $f_{FRF}$.

The time distance t between two pulses with different frequency following each other determines a certain PRF-value $f_{PRF}$ which, with the exception which will be dealt with below, should be constant. The smallest time distance between two pulses which have the same frequency defines the frequency repetition frequency $f_{FRF}$.

The process according to the invention is intended to be used in a tracking radar i.e. a radar which after that a certain target has been detected, i.e. the target range is known, will follow the target. The radar will then transmit pulses with fixed pulse length $\tau$ and with continuously variable PRF.

Furthermore, in the radar N fixed frequencies have to be available and N>/M where M is the number of transmitted frequencies used during tracking. As will be described more fully later there is a control device for calculating certain conditions and to give the control signals to transmitters and receivers.

It is assumed that the radar has captured a certain target and carried out a rough estimate of the target range Ro. A frequency repetition frequency $f_{FRF}$ is then chosen so that the condition $c/2\ f_{FRF} > Ro$ - - - (1) is fulfilled.

A certain smallest listening interval tm between two transmitted pulses is determined and the value of tm is chosen regarding a certain loss of time as frequency changing time and recovery time for the receiver. The number of chosen frequencies $M \leq N$ is determined so that $Mt_m \leq 1/f_{FRF}$ ... (2), whereby $R_o < c\ Mt_m/2 \leq c/2\ f_{FRF}$ The condition (1) says that for a certain chosen value of $f_{FRF}$ a certain unambigous range $c/2\ f_{FRF}$ (generally valid for a pulse radar) is obtained. For a certain target range, consequently, it is valid that $f_{FRF}$ has such a value that this unambigous range can be fulfilled for the measured target range $R_o$. The condition (2) limits the value of the number of chosen frequencies M. A third condition is that the target will be present in a range aperture, i.e. for some integer n, $$\left(\frac{n}{Mf_{FRF}} + \tau + \epsilon\right) = 2Ro, \quad (3)$$

should be valid, where $\epsilon$ constitutes a measure of the time margin for an echo pulse until a new value of M will be chosen.

Figure 2:
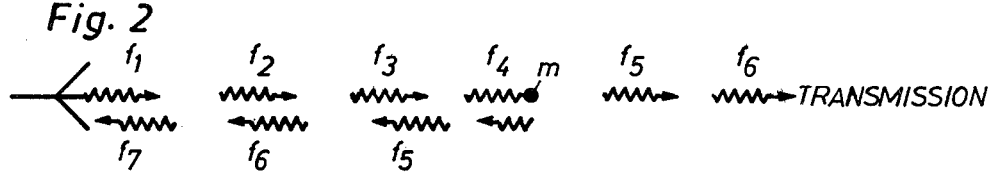
FIGS. 2–4 show schematically transmitted and received radar pulses in accordance with the method of the invention.
Figure 2:
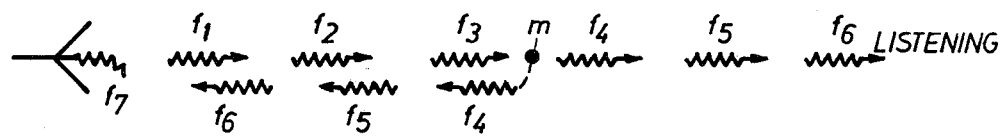

The factor $1/Mf_{FRF}$ constitutes the time between two subsequent radar pulses with different frequency. The factor n indicates the number of pulses which are transmitted between a certain transmitting pulse (this uncounted) and the time when the target echo from the transmitting pulse is received. The factor $n/Mf_{FRF}$ is then the time for the sum of transmitted and reflected pulses, the factor $(\tau+\epsilon)<$ listening interval being added to this time. FIG. 2 shows schematically and in reduced scale transmission and reception of pulses with mutually different frequency within a pulse series. The upper part in FIG. 2 shows the transmission instant when the transmitting pulse with the frequency $f_1$ leaves the antenna A and the pulse with the frequency $f_4$ is assumed to have reached a target m. The lower part shows the reception of an echo pulse with the frequency $f_7$ during the time interval t-$\tau$ between two transmitting pulses. In FIG. 2, n=6 which corresponds to the number of pulses during the time when the pulse with the frequency $f_1$ is transmitted until the pulse with the frequency $f_7$ should be received.

Figure 3:
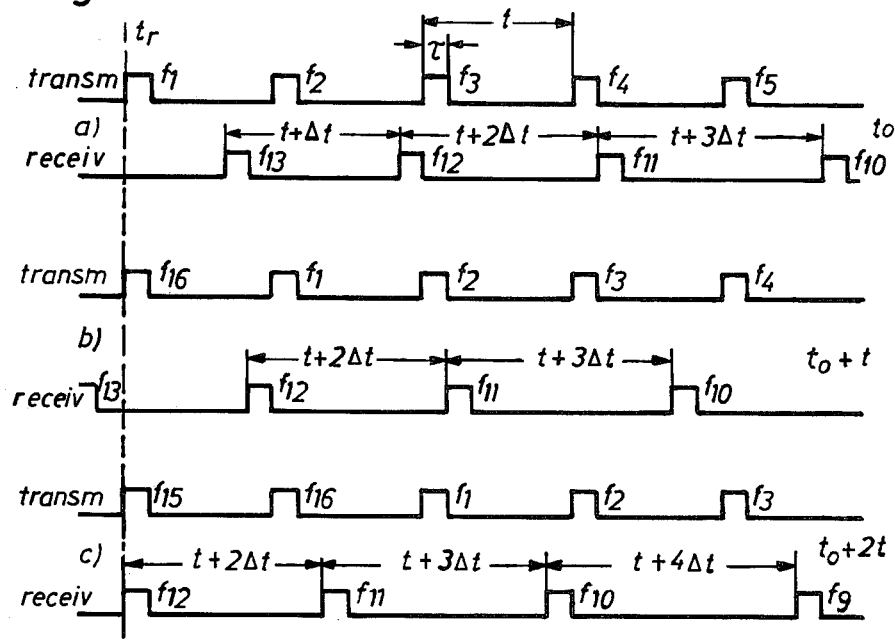

In FIG. 3 a timing diagram is shown of the transmitting and receiving pulses from and to the antenna system of the radar, respectively. The diagram indicates the position of the transmitting pulses and received echo pulses at the times to, to+t, to+2t and so on, tr constituting the reference point of time (indicated by dotted line) and which is the time when the transmitting pulse and receiving pulse must not coincide in order that the detection be possible in the receiver. At the time to (waveform a of FIG. 3) the time position for the transmitting pulses is such that the pulse with the frequency $f_1$ should just be transmitted after which the pulses with the frequencies $f_2, f_3 \ldots f_5$ and so on have been transmitted. It is assumed that at the same instant (to) the receiver pulse with the frequency $f_{13}$ in turn will reach the antenna and be detected in the receiver before the receiving pulses with the frequencies $f_{12}, f_{11}$ and so on arrive. The transmitting pulses with the frequencies $f_1 \ldots f_5$ and so on have a constant PRF, i.e., the time interval t is constant. For the transmitting pulses with the frequency $f_{13}, \ldots$ it has been assumed that the target recedes with constant speed, so that if the time distance between, for example, the pulse $f_{13}$ and $f_{12}$ is t+$\Delta$t, the corresponding time distance between the pulses $f_{12}$ and $f_{11}$ will be t+2$\Delta$t and so on. When detecting during the time interval t-$\tau$ the receiver is tuned to the frequency $f_{14}$ which is detected and a value of the target range R1 can be determined since the instant for the transmission of the pulse $f_{14}$ is known. At the time to +t (waveform b of FIG. 3), the pulse $f_{16}$ has just been transmitted and the receiver has been tuned so that the pulse $f_{13}$ can be detected during a new time interval t-$\tau$, a new value R2 on the target range being obtained. At the time $t_0+2t$ (waveform c of FIG. 3), the pulse $f_{15}$ is transmitted but simultaneously the receiving pulse $f_{12}$ arrives which implies that the reception and transmission occurs simultaneously. Herewith the transmission pattern is interrupted and a new estimation of $f_{FRF}$ and M is made by means of the actual value of the target range and according to the condition (1)-(3). Alternatively, a change of the pulse repetition frequency $f_{PRF}$ can be carried out. The change in $f_{FRF}$ and M will in practise occur with low frequency if the range aperture is not too small (for example, at least 100 m), since actual target speeds are situated below, for example 1000 m/s. With the exemplified values the frequency for updating of $f_{FRF}$ and M become smaller than 10 Hz. This can be regarded to imply a negligable disturbance of the radar function if $f_{PRF}$ is larger than, for example, 1 kHz.

Figure 4:
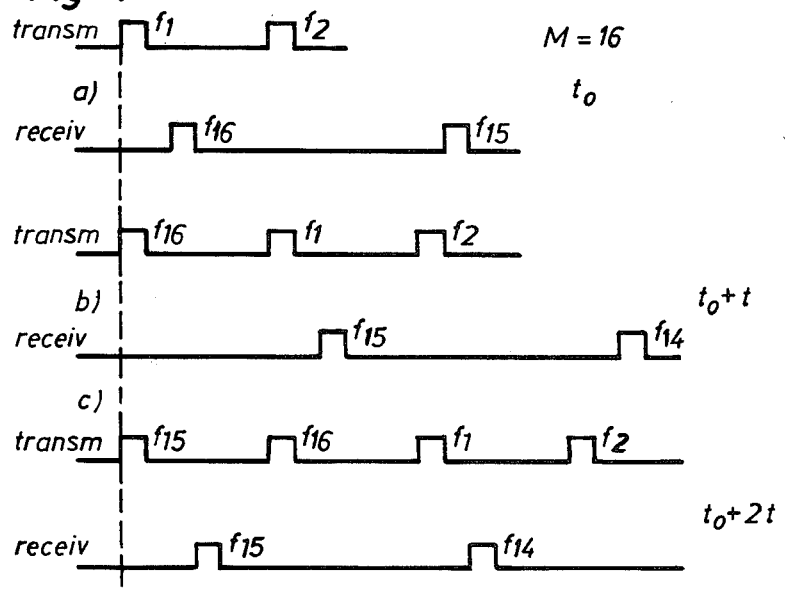

When the measured target distance is close to a value $R=R_k$ such that the inequality (1) no longer is fulfilled, no longer an unambiguous detection of the receiving pulses occurs. FIG. 4 illustrates this case. In waveform a of FIG. 4 the transmitting pulse $f_1$ has just been transmitted and the receiving pulse $f_{16}$ corresponding to the transmitting pulse $f_{16}$ within the same pulse series is about to arrive and to be detected. This detection will be correct, because the receiving pulse $f_{16}$ corresponds unambigously to the target range, since it is assumed that all the frequencies in a series of pulses $f_1, \ldots, f_{16}$ have been transmitted and reflected. In waveform b of FIG. 4, which shows the situation at the time $t_0+t$ again a transmitting pulse $f_{16}$ is transmitted in a new series of pulses $f_1, \ldots, f_{16}$ and the receiving pulse $f_{15}$ arrives. The previous receiving pulse $f_{16}$ then gives an unambiguous and correct value of the target range R. At the time $t_0+2t$ (waveform c of FIG. 4), however, shows that there is time for the transmitting pulse $f_{15}$ in the new series to be transmitted before the receiving pulse $f_{15}$ in the previous series has been received and given a detection of the target range. The receiving pulse $f_{15}$ gives therefore an erroneous value of the target distance which will be too small. The transmitting pulse $f_{15}$ should therefore be rejected and a new series with a larger number of frequencies should be started, for example, a series $f_{32}, f_{31}, \ldots$. Even in this case the transmitting pattern will be interrupted and a new estimate of $f_{FRF}$ and M is carried out according to the above.

Figure 5:
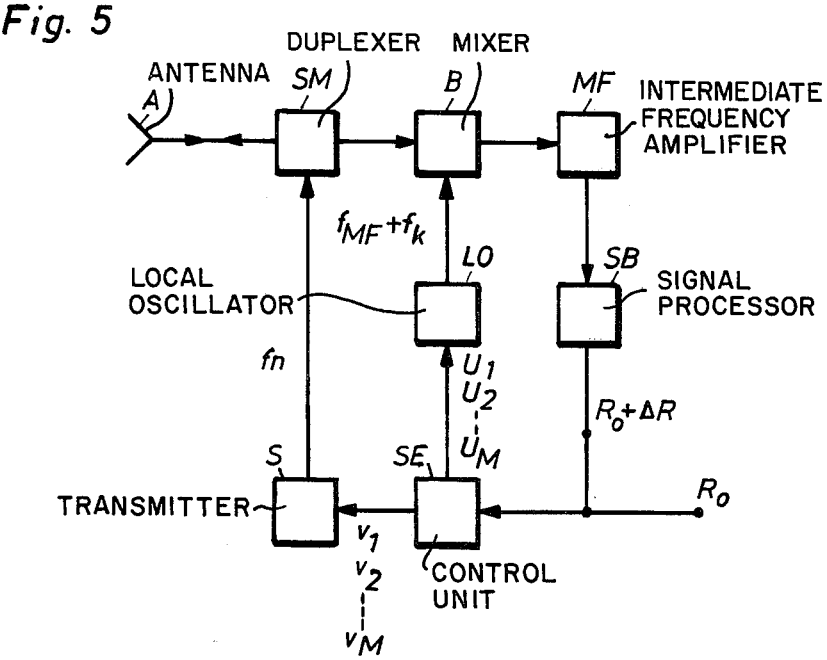
FIG. 5 is a block diagram of the transmitter-receiver part of a tracking radar which use the method according to the invention.

FIG. 5 shows a block diagram of the transmitter-receiver part in a tracking radar which uses the method according to the invention. The antenna unit A of the radar can consist of, for example, a fixed non-directive radiating antenna which is connected to a duplexer SM, consisting of a circulator. To the duplexer is in a manner known per se a transmitting unit S and a mixer B whose output is connected to the intermediate frequency amplifier MF. A local oscillator LO is connected to the mixer B and transmits a signal whose frequency constitutes the sum of a chosen intermediate frequency $f_{MF}$ and a high-frequency $f_k$. A control unit SE is connected to the transmitting unit S and to the local oscillator LO in order to deliver certain determined voltage levels v1, v2, ..., vM as control signals. Furthermore, a signal processor SB is connected to the control unit SE and to the output of the intermediate frequency amplifier MF to calculate the target distance R from the incoming target echo pulses. The units shown in FIG. 5 correspond to those in a conventional non-coherent pulse radar with the exception of the control unit SE and the transmitting unit S together with the local oscillator LO which two last mentioned units are designed in another way but have in principle the same function as in a conventional pulse radar, see for example Barton, pages 383-384.

The transmitting unit S can consist of, for example, a voltage control oscillator a so called VCO of a type known per se which obtains the control signals v1, v2, ... from the control unit SE. The transmitting unit S delivers pulse formed transmitting signals with the pulse repetition frequency $f_{PRF}$ and the pulse length $\tau$, the carrier frequency of each of the pulses being mutually different and is determined by the incoming levels v1, v2, ... vM. The synchronization and the correct pulse length is achieved in a manner known per se by means of synchronizing pulses from the control unit SE. To the duplexer, thus, a series of pulses containing the M frequencies fn (n=1, 2, ..., M) is delivered, the carrier frequency being changed from one pulse to another according to a chosen pattern as described above, compare FIG. 2. For synchronization the transmitting unit can, for example, include a gate circuit not shown which is controlled by the pulses with the length $\tau$ and the pulse repeting frequency $f_{PRF}$.

The local oscillator LO consists, like the transmitting unit S, of, for example, a voltage controlled oscillator, VCO, which to the mixer B delivers pulse formed signals with the frequencies $f_{MF}+f_k$, where $f_{MF}$ is the chosen intermediate frequency and where k is an integer $\geq$ n which at the beginning of each pulse series is chosen in the control unit SE in depence on the number M of chosen frequencies fn (n=1, 2, ..., M) and the calculated target range R.

Figure 6:
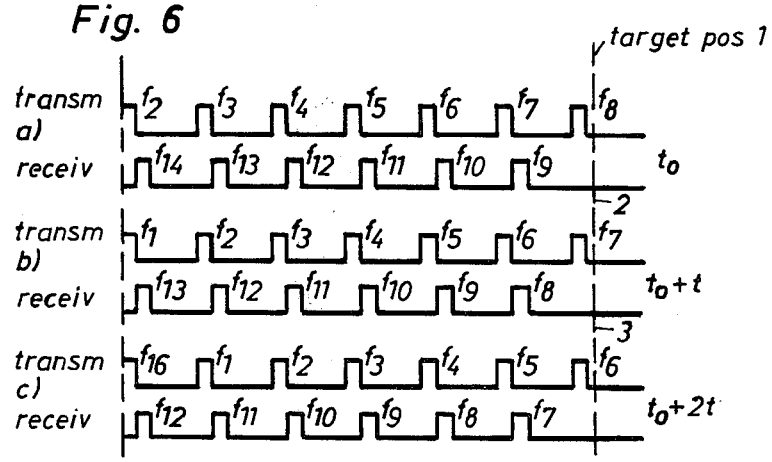
FIG. 6 shows a different target positions the transmitter- and the receiver pulses from and to the transmitter-receiver part, respectively according to FIG. 5.

FIG. 6 shows at different times $t_0$, $t_0+t$, $t_0+2t$ the order numbers n and k for the carrier frequency (fn and fk respectively) of the transmitted and received pulses, respectively. At the time $t_0$ the frequency $f_2$ (n=2) is transmitted according to waveform a of FIG. 6 and the pulse with the frequency $f_8$ will just be reflected towards the target (dotted line). The pulses with the frequencies $f_9$-$f_{14}$ constitute echo pulses and the pulse with the frequency $f_{14}$ will just be received and detected. The local oscillator LO according to FIG. 5 will thus deliver a signal with the frequency $f_{MF}+f_{14}$ (k=14). At the time $t_0+t$, a pulse is transmitted with the frequency $f_1$ (n=1) and an echo pulse with the frequency $f_{13}$ will be received (waveform b of FIG. 6), for which reason the local oscillator frequency should be $f_{MF}+f_{13}$. At the time $t_0+2t$ (waveform c of FIG. 6) a new series of transmitting pulses is started beginning with the transmitting pulse with the carrier frequency $f_{16}$ (M=16), while the local oscillator delivers a signal $f_{MF}+f_{12}$ corresponding to the transmitting pulse with the frequency $f_{12}$ from the previous series. In the example according to FIG. 6 it is assumed that the target speed is so low in comparison to the pulse repetition frequency $f_{PRF}$ that there is no time for the target to be able to move outside a listening interval $1/f_{PRF}$ during the time a series of pulses $f_1, \ldots, f_{16}$ is transmitted and received.

The target distance $R_0$ calculated from the beginning is supplied to the control unit SE. Unit ST calculates with the guidance of this value and according to the condition (1), (2) and (3) above at first a value of the frequency repetition frequency $f_{FRF}$ and after that the number of carrier frequencies M. In the control unit there is stored a number of tables where each table includes a number of frequencies, for example, M1, ...

, $M_j \leq N$, the number $M_j$ being dependent on a certain target range $R_j$. After selection of a certain table containing the frequencies $f_1, f_2, \ldots, f_{M_j}$ corresponding to the target distance $R_j$ ($j=0$ from the beginning) the control unit SE delivers the voltage levels $v_1, \ldots, v_{M_j}$ and the levels $u_1, \ldots, u_{M_j}$) to the transmitting unit S and to the local oscillator LO, respectively. After that, a calculation occurs of the change $\Delta R$ in the target range from the original value $R_o$. At the end of each pulse series it is stated whether the new value $R_j$ is such that the same pulse series once again can be transmitted, a calculation of a new $R_j$ being carried out. If this new value is too large regarding the chosen value of $1/f_{FRF}$, a new pulse series from a table is selected which includes a larger number of carrier frequencies $f_1, \ldots, f_{M_j}$ than the previous series.

The process of the invention gives the following advantages:

High resolution can be obtained with short pulse length ($\tau$) which, combined with a high PRF, gives a high data rate and high working factor. This is an advantage especially for semiconductor transmitters.

The frequency shift in the carrier frequencies (the so called frequency agility) gives glimpse reduction in fire control radar and improved jammer resistance. Narrow band interference from other objects than the target is in practise impossible, since actual receiving frequency for these objects is unknown.

Low pulse effect is possible, as the working factor is high. Furthermore, a wide frequency spectrum is given due to the frequency shift. These qualities give a relatively "quiet" radar. Furthermore, like the known radar systems mentioned in the introduction, no interference from nearby situated reflections as for example, ground clutter is obtained due to the frequency shift.

We claim:

1. A method in a tracking radar for achieving a large unambiguous range for a detected target in which radar pulses are transmitted in series with a certain high pulse repetition frequency ($f_{PRF}$), a certain pulse length ($\tau$) and a certain listening interval ($t-\tau$) between two subsequent pulses, the carrier frequency varying from one pulse to the next following in one and the same series, but reappearing in the same order from one series to the next so that for a certain series a total of M frequencies appear, where the number M is chosen so that $M \cdot t_m \geq 1/f_{FRF}$ and where $t_m$ is the smallest value of the listening interval ($t-\tau$) and $f_{FRF}$ is the frequency with which the pulse series are repeated, comprising (a) measuring the detected target range with an accuracy corresponding to at least half of a listening interval ($t-\tau$) to obtain a certain initial value $R_o$; (b) choosing a certain value of the frequency repetition frequency $f_{FRF}$ so that the condition $c/2 f_{FRF} > R_o$ is fulfilled where C is the speed of light; (c) after one or more pulse series have been transmitted and the corresonding target echo pulses belonging to a certain series have been received, making a new measurement of the target range so that a new value $R_1$ is obtained; (d) if the measured distance $R_1 < R_k$ where $R_k$ is the highest value for which $c/2f_{FRF} > R_k$ being valid, a new series with the same number M frequencies and the same order as previously being transmitted, while if $R_1 > R_k$, a new pulse series with a greater number $M_1 > M$ frequencies corresponding to a lower value on the frequency $f_{FRF}$ being transmitted.

2. A method according to claim 1, characterized in that the number M of frequencies in a pulse series and the value of the frequency $f_{FRF}$ are chosen so that for any integer n the relationship $$n/Mf_{FRF} + \tau\epsilon = 2R_o/c \text{ is satisfied}$$

where $\epsilon > 0$ is a measure on the time margin for an incoming target echo pulse to the nearest transmitted radar pulse and n is the number of pulses which are transmitted during the time from a transmitting pulse until the echo from said transmitting pulse is received.

* * * * *